US007289863B2

(12) United States Patent
Arruda et al.

(10) Patent No.: US 7,289,863 B2
(45) Date of Patent: Oct. 30, 2007

(54) SYSTEM AND METHOD FOR ELECTRONIC DIAGNOSTICS OF A PROCESS VACUUM ENVIRONMENT

(75) Inventors: Joseph D. Arruda, Swansea, MA (US); Kathleen D. Keay, Franklin, MA (US); Glen F. R. Gilchrist, Danvers, MA (US)

(73) Assignee: Brooks Automation, Inc., Chelmsford, MA (US)

( * ) Notice: Subject to any disclaimer, the term of this patent is extended or adjusted under 35 U.S.C. 154(b) by 237 days.

(21) Appl. No.: 11/206,675

(22) Filed: Aug. 18, 2005

(65) Prior Publication Data
US 2007/0043534 A1 Feb. 22, 2007

(51) Int. Cl.
G06F 14/00 (2006.01)
G01M 3/32 (2006.01)
G01M 3/04 (2006.01)

(52) U.S. Cl. .................. 700/110; 700/121; 702/51; 73/40; 73/40.7

(58) Field of Classification Search ............... 700/110, 700/121; 702/183, 45, 51, 140, 185; 73/40, 73/40.7, 49.2
See application file for complete search history.

(56) References Cited

U.S. PATENT DOCUMENTS

| | | | |
|---|---|---|---|
| 4,821,769 A | 4/1989 | Mills et al. | |
| 4,823,602 A | 4/1989 | Christensen, Jr. | |
| 4,918,930 A | 4/1990 | Gaudet et al. | |
| 5,008,841 A | 4/1991 | McElroy | |
| 5,140,263 A | 8/1992 | Leon | |
| 5,154,080 A | 10/1992 | Hill et al. | |
| 5,257,545 A | 11/1993 | Au-Yang | |
| 5,327,783 A | 7/1994 | Au-Yang | |
| 5,329,956 A | 7/1994 | Marriott et al. | |
| 5,443,368 A | 8/1995 | Weeks et al. | |
| 5,471,400 A | 11/1995 | Smalley et al. | |
| 5,477,149 A | 12/1995 | Spencer et al. | |
| 5,777,901 A | 7/1998 | Berezin et al. | |

(Continued)

FOREIGN PATENT DOCUMENTS

JP 59-017079 1/1984

(Continued)

OTHER PUBLICATIONS

Hung, M., et al., "Development of an e-Diagnostics/Maintenance framework for semiconductor factories with security considerations", *Advanced Engineering Information 17* (2003) 165-178.

(Continued)

*Primary Examiner*—Leo Picard
*Assistant Examiner*—Steven R. Garland
(74) *Attorney, Agent, or Firm*—Hamilton, Brook, Smith & Reynolds, PC

(57) ABSTRACT

In one embodiment according to the invention, there is disclosed a method of identifying a source of a vacuum quality problem in a vacuum environment associated with a tool. The method comprises gathering and storing vacuum environment data; identifying an anomaly within the vacuum environment; determining a tool component operating state when the anomaly likely occurred; and determining the source of the vacuum quality problem based on a state of the vacuum environment when the anomaly likely occurred and the tool component operating state when the anomaly likely occurred.

44 Claims, 15 Drawing Sheets

U.S. PATENT DOCUMENTS

| | | |
|---|---|---|
| 6,022,195 A | 2/2000 | Gaudet et al. |
| 6,073,089 A | 6/2000 | Baker et al. |
| 6,240,329 B1 | 5/2001 | Sun |
| 6,272,400 B1 | 8/2001 | Jankins et al. |
| 6,304,791 B1 | 10/2001 | Kim |
| 6,349,589 B1 * | 2/2002 | Zhou .............................. 73/40 |
| 6,532,392 B1 | 3/2003 | Eryurek et al. |
| 6,618,692 B2 | 9/2003 | Takahashi et al. |
| 6,619,123 B2 | 9/2003 | Gianchandani et al. |
| 6,671,583 B2 | 12/2003 | Varone et al. |
| 6,902,378 B2 | 6/2005 | Gaudet et al. |
| 6,907,383 B2 | 6/2005 | Eryurek et al. |
| 6,955,072 B2 | 10/2005 | Zarkar et al. |
| 2002/0035447 A1 | 3/2002 | Takahashi et al. |
| 2003/0010092 A1 | 1/2003 | Lu et al. |
| 2005/0010311 A1 | 1/2005 | Barbazette et al. |
| 2005/0072239 A1 | 4/2005 | Longsdorf et al. |
| 2005/0091843 A1 | 5/2005 | Yu |
| 2005/0132808 A1 | 6/2005 | Brown et al. |
| 2005/0171736 A1 | 8/2005 | Kang |

FOREIGN PATENT DOCUMENTS

| | | |
|---|---|---|
| JP | 03-079805 | 4/1991 |
| JP | 04-254734 | 9/1992 |
| JP | 2000 205992 A | 7/2000 |

OTHER PUBLICATIONS

Hung, M., et al, "An e-Diagnostics Framework with Security Considerations for Semiconductor Factories", *IEEE*, 2004, pp. 37-40.

Hung, M., et al., "Development of a Web-Services-Based e-Diagnostics Framework for Semiconductor Manufacturing Industry", *IEEE Transactions on Semiconductor Manufacturing*, vol. 18, No. 1, Feb. 2005, pp. 122-135.

Huang, H., et al., "Development of Remote Control System of a Semiconductor Cluster Tool", *2002 IEEE International Conference on Systems, Man and Cybernetics*, Yasmine Hammamet-Tunisia, Oct. 6-9, 2002.

Conarro, P., et al., "Using Measurement Tools to Assess the Health of Fab Automation Systems", *MICRO: Lead News*, downloaded off the Internet Nov. 8, 2005, pp. 1-9.

* cited by examiner

SYSTEM AND METHOD FOR ELECTRONIC DIAGNOSTICS OF A PROCESS VACUUM ENVIRONMENT

BACKGROUND OF THE INVENTION

Many semiconductor and coating manufacturing processes require a consistent, reproducible, high quality vacuum environment within the process chamber. Such a vacuum environment is essential for process optimization, tool utilization, and yield. An optimal process vacuum environment is free of leaks, contamination, and outgassing; and has all components and subsystems operating as specified.

Some prior techniques for diagnosing problems with vacuum components in such systems involve pattern recognition and statistical methods. Pattern recognition techniques require generating component failures, and measuring the attendant circumstances. Statistical techniques measure all relevant parameters, and attempt to correlate some of the parameters with component failures.

SUMMARY OF THE INVENTION

A method and system are provided for identifying a source of a vacuum quality problem in a vacuum environment associated with a tool, such as a semiconductor processing cluster tool. Vacuum environment data is gathered and stored; and an anomaly is identified within the vacuum environment. A tool component operating state when the anomaly likely occurred is determined. The source of the vacuum quality problem can then be determined based on a state of the vacuum environment when the anomaly likely occurred and the tool component operating state when the anomaly likely occurred. The state of the vacuum environment is defined by pressure measurements such as absolute pressure, base pressure and rate of pressure rise as well as the gaseous species and levels within the environment. The operating state of the tool component is defined by states of processing equipment, vacuum isolation components such as bellows and seals, and interfaces to vacuum equipment such as gate valves to vacuum pumps.

Determining the source of the vacuum quality problem may be further based on state of vacuum equipment such as a cryopump, turbopump, or other vacuum pumping component. It may also be based on history of the state of the vacuum environment, history of tool state and history of vacuum equipment.

Identification of the anomaly may include analysis of instantaneous measurements, a vacuum environment history and/or a tool state history. It may include analysis of one or more measurements from a group consisting of pressure rate of rise, base pressure, base pressure trend, residual gas analysis, operating pressure, operating pressure history and pressure recovery curve. The anomaly may be a change in base pressure or a change in pressure rate of rise.

The anomaly may be identified and its source determined by means of automatic data analysis. Identifying the source of the anomaly prior to failure enables preventative maintenance. Automatic electronic notification of the source of the vacuum quality problem may also be provided as by means of an automatic email to service personnel responsible for maintenance of the equipment.

The step of determining the source of the vacuum quality problem may be further based on a general tool operating state, which may include a state from a group consisting of idling, turned off, qualification, pumpdown, and processing.

The tool component operating state may be determined by sensing the tool component operating state, or by analysis of the vacuum environment data.

In one embodiment, there is provided a computer-readable medium carrying one or more sequences of instructions for identifying a source of a vacuum quality problem in a vacuum environment associated with a tool. Execution of the one or more sequences of instructions by one or more processors causes the one or more processors to perform the steps of: gathering and storing vacuum environment data; identifying an anomaly within the vacuum environment; determining a tool component operating state when the anomaly likely occurred; and determining the source of the vacuum quality problem based on a state of the vacuum environment when the anomaly likely occurred and the tool component operating state when the anomaly likely occurred.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

There is provided a method of automatic fault detection and classification (FDC) for a process vacuum environment, which finds particular use in semiconductor and coating manufacturing. The method is capable of root-cause analysis, from the system level down to the component level. Because of its predictive capabilities, the method allows faults to be analyzed and corrected before they have an impact on the process, yield, and throughput. Unscheduled downtime is minimized because production is halted only for scheduled replacement of consumables.

Figure 1:
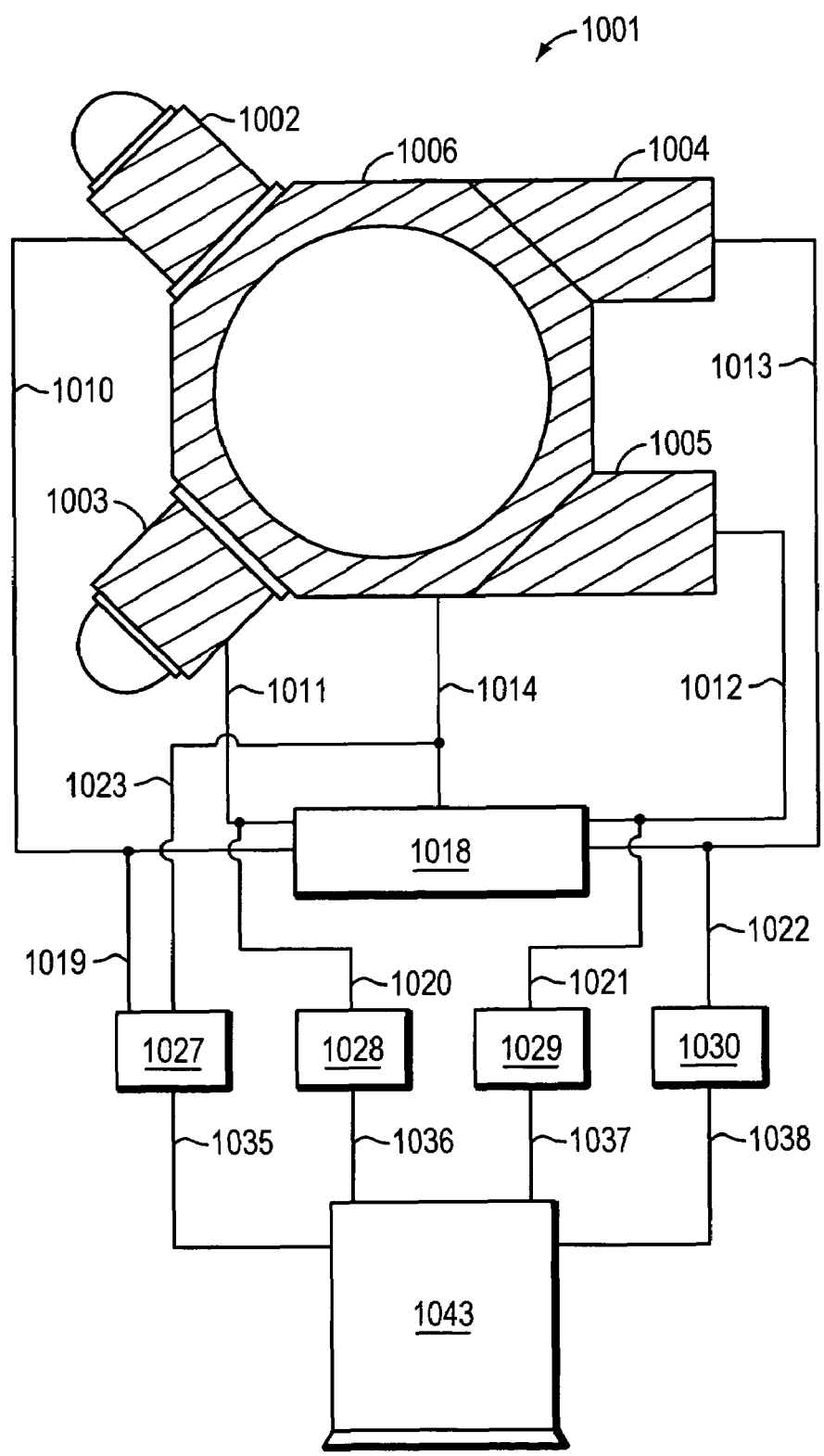
FIG. 1 shows a semiconductor cluster tool, with which a system for electronic diagnostics is used according to an embodiment of the invention.

FIG. 1 shows a semiconductor cluster tool 1001, with which a system for electronic diagnostics is used according to an embodiment of the invention. Process chambers 1002, 1003, load locks 1004, 1005, transfer chamber 1006, and other components of the cluster tool 1001 come equipped with a variety of sensors, including pressure, temperature, water flow, and other sensors. Sensor output lines 1010-1014 from these sensors are fed to a tool controller 1018. In an embodiment according to the invention, analog diagnostics lines 1019-1023 are used to tap into the sensor output lines, and to feed the sensor outputs to one or more diagnostics communications units 1027-1030. The diagnostics communications units 1027-1030, in turn, convert the analog sensor outputs into digital signals, and feed these signals over digital diagnostics lines 1035-1038 to a diagnostics local server 1043. Although four communications units 1027-1030 are shown in FIG. 1, there may in general be any number of such communications units 1027-1030. There may be one communications unit 1027-1030 per chamber 1002-1006 and many communications units 1027-1030 per local server 1043 (for example, up to fifty communications units per local server). Alternatively, there need not be a one-to-one correspondence between the number of chambers 1002-1006 and the number of communications units 1027-1030. Many different cabling and data transfer arrangements may be used, also, and each of the illustrated sensor output lines 1010-1014, analog lines 1019-1023, and digital lines 1035-1038 may carry multiple different signals. In addition, it should be appreciated that, where possible, digital lines carrying converted sensor output signals may lead directly from tool controller 1018 to the local server 1043, thereby avoiding the need to use some or all of the communications units 1027-1030, analog lines 1019-1023, and/or digital lines 1035-1038.

Figure 2:
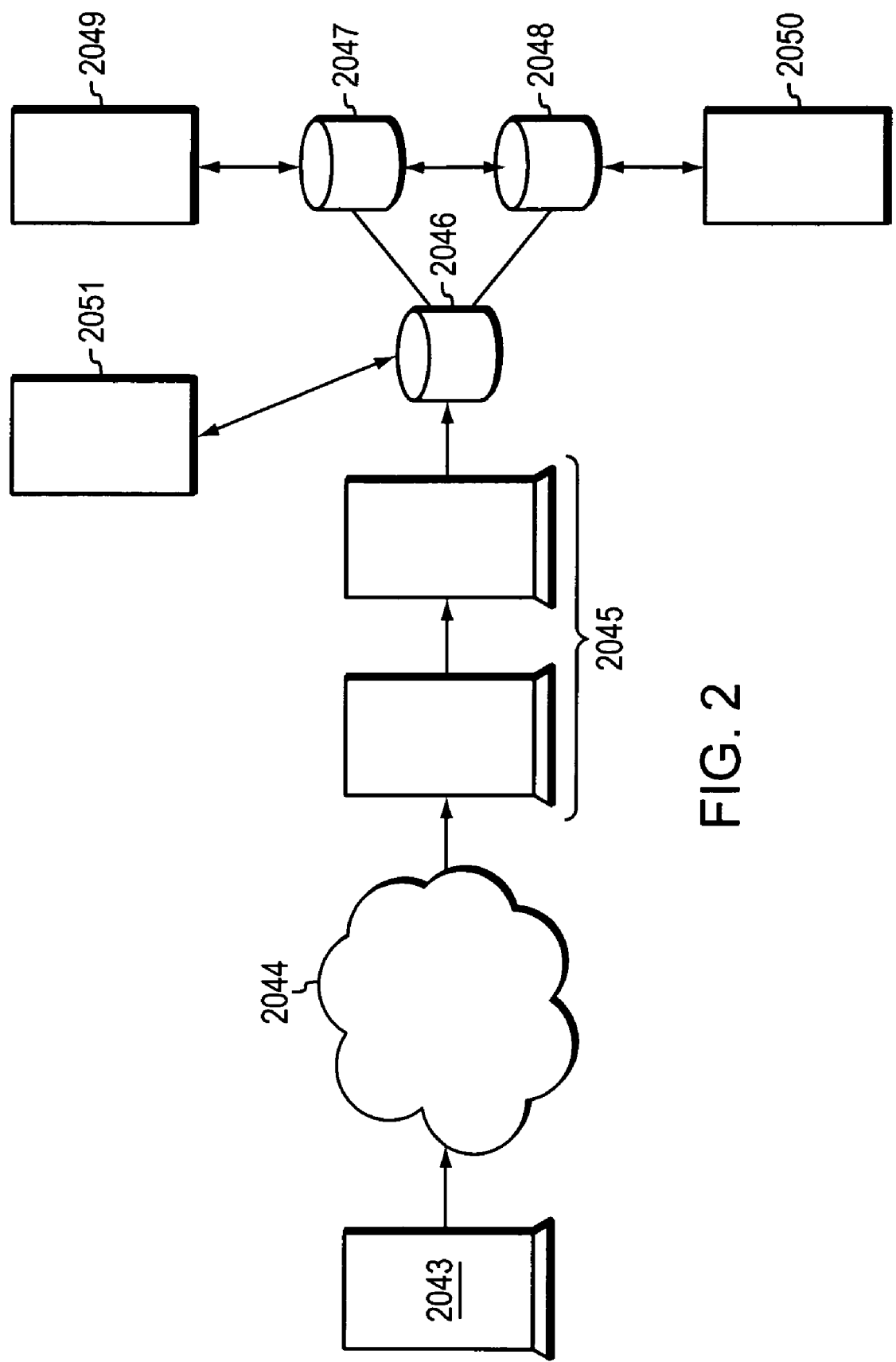
FIG. 2 shows an arrangement of data-processing equipment for performing electronic diagnostics of data communicated from the system of FIG. 1, in accordance with an embodiment of the invention.

FIG. 2 shows an arrangement of data processing equipment for performing electronic diagnostics of data communicated from the system of FIG. 1. Data from the diagnostics local server 2043 (corresponding to the local server 1043 of FIG. 1) is transmitted over a communications network 2044, such as the Internet, to a set of staging computers 2045. The transmission from the local server 2043 may be, for example, in the form of an e-mail attachment sent over network 2044 to the staging computers 2045. The local server 2043 may be located on the same premises as the cluster tool 1001 of FIG. 1, and may send data over network 2044 to the other data processing equipment of FIG. 2, located at a facility where the data analysis takes place. The data transmitted from local server 2043 is unpackaged into staging computers 2045 and stored in databases 2046-2048, which may operate on typical data warehousing equipment. Computer systems may then use the stored data from databases 2046-2048 to produce an analysis 2049 and a display 2050 of the results of the analysis, and to send electronic notifications 2051. In addition, some preliminary analysis can be performed by local server 1043 of FIG. 1, which may send some notifications (for example over network 2044 or another communications link) directly, intead of, or in addition to, notifications sent by server 2043. In some embodiments, all analysis and notifications described below may be performed by local server 1043; although typically the arrangement of FIG. 2 may be used.

Notifications 2051 may be sent to customers of a company that operates the data processing equipment of FIG. 2, and to customer support engineers in the field. Such an automatic notification 2051 may, for example, take the form of an e-mail to a customer, or a customer support engineer, with instructions to adjust an operating parameter of the vacuum process equipment of FIG. 1; or to change out a component of the vacuum process equipment. More generally, a notification may include a statement of the problem and the recommended corrective action. To produce the analysis 2049, computer-readable code running on a computer system is used to comb through the data sent to databases 2046-2048 and to look for specific quantitative relationships within the data.

In one type of analysis, a processor looks for signals indicating "Gate Valve is Closed" and "Slit Valve is Closed." When both of these signals are in the "true" state, it is inferred that the chamber is isolated, and the processor looks at pressure versus time data transmitted from the tool 1001 and derives a relationship between pressure and time for a chamber of the tool 1001. In this way, a processor is used to infer the state of a chamber of tool 1001 based on data from the communications units 1027-1030 and/or from the host tool. In the case of pressure versus time data, for example, three states could be inferred: external leak; outgassing; or no leak. This state is derived from knowledge of the physics of a chamber of tool 1001 and the values of the sensor outputs 1010-1014. Based on the state that is inferred, the system derives an analysis of where a fault is occurring in tool 1001; and may then recommend appropriate corrective action. A notification may be sent based on an analysis of the rate of rise of pressure versus time when the gate valve is closed, for example. Such a notification is, below, called a chamber rate of rise notification. A chamber rate of rise analysis is performed when the vacuum pump gate valve is closed, and all other valves remain closed; and allows characterization of leaks and outgassing within the vacuum chamber. Rate of rise limits may be established for individual customers, and used as the basis for triggering an exception notification.

Figure 3:
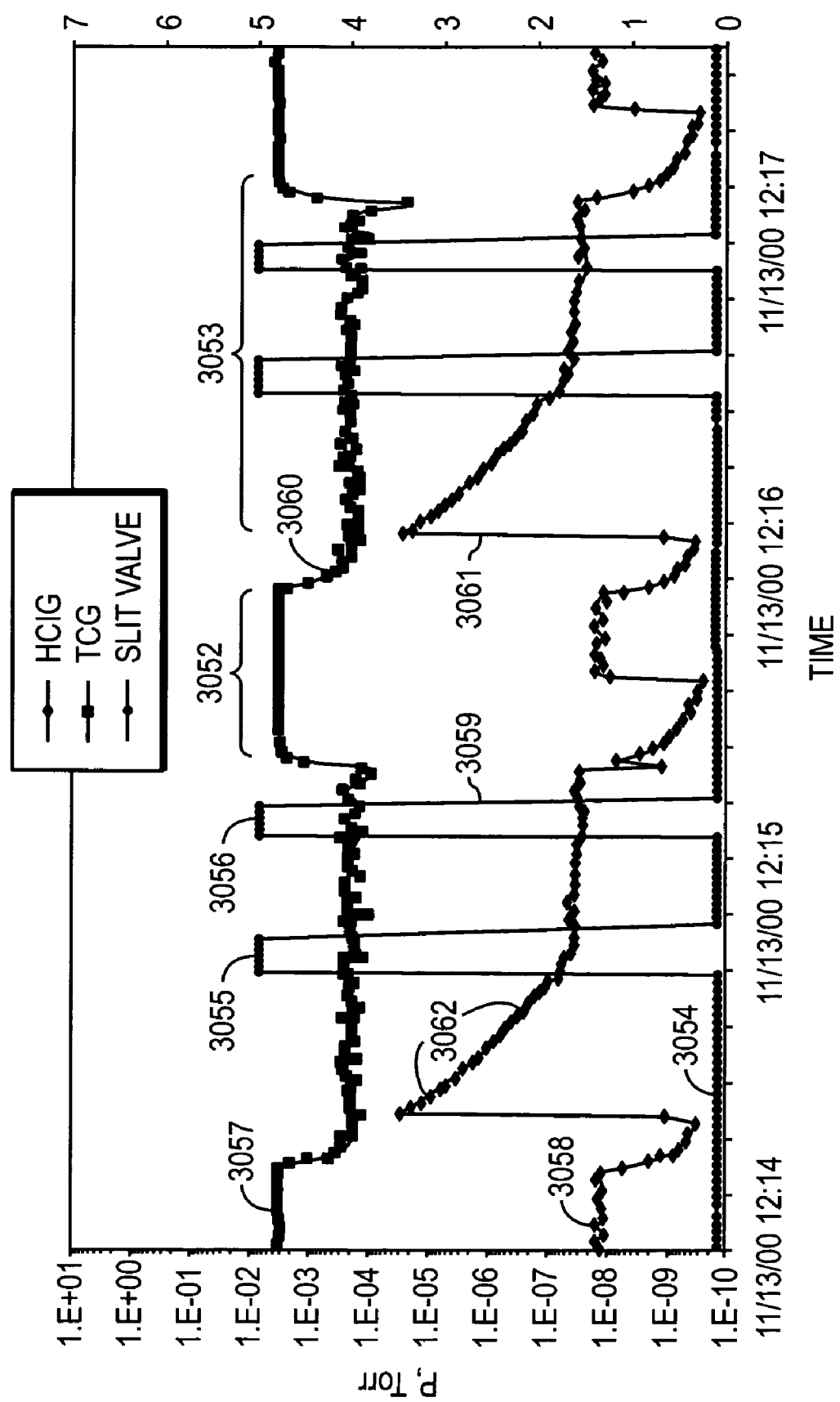
FIG. 3 shows pressure and slit valve signals received over time during a process/recovery cycle, which may be used to determine a base pressure in accordance with an embodiment of the invention.

Another type of analysis relies on a determination of a base pressure in a chamber of the tool 1001. FIG. 3 shows pressure and slit valve signals received by local server 1043 over time during a process/recovery cycle, which may be used to determine a base pressure. Pressure in Torr is shown on a logarithmic scale on the y-axis, with time on the x-axis (in this example, pressure goes from $10^{-10}$ Torr up to $10^{-1}$ Torr, and time extends for roughly three and a half minutes). A Convectron® gauge pressure is plotted at 3057, an ion gauge pressure is plotted at 3058, and a slit valve state signal is plotted at 3059. These signals may be collected at a 1 Hz sample rate (for example). As in the analysis performed for the chamber rate of rise notification, the analysis of FIG. 3 begins by deriving a state of a chamber of the tool 1001. FIG. 3 shows a series of process/recovery cycles, with a process stage 3052 followed by a recovery stage 3053. A computer processor (associated, for example, with the data processing equipment of FIG. 2) may determine the end of the process stage 3052 by detecting a Convectron® gauge pressure going to its base value, as at 3060. Also, the computer processor may determine the cycle times for the process/recovery cycles by observing the state of the slit valve, which is closed 3054 during the process stage, but opens twice 3055 and 3056 during the recovery stage. In addition, the computer processor may cue in on a large increase 3061 in the ion gauge pressure to detect the beginning of the recovery stage 3053. Based on signal features such as these, the computer processor may determine the duration of the process stages, and the times when each process stage starts and stops; and, from the non-process time, may determine the duration of the recovery stages. The computer processor may then take the pressure versus time relationship 3062 during a recovery stage, and use a curve-fitting equation (such as a negative exponent with a constant) to most closely fit the curve. By extrapolating the curve into the future, the computer processor may then estimate a base pressure for the system, which would be the pressure if the chamber was allowed to slowly evacuate over a long period (such as twenty-four hours).

Based on the data shown in FIG. 3, the computer processor may plot the determined base pressure each day; determine if it has increased; and determine whether the increase is greater than a customer-specified limit. If so, the computer processor may send an automated notification 2051, such as an e-mail with attached Excel file reports, indicating that the base pressure has increased beyond the customer-specified limit. The Excel file reports, for example, may provide plots and calculations performed before and after an exception was detected, which may be useful in diagnostics. Such a notification based on an increase in base pressure is here known as a composite base pressure notification. The composite base pressure notification may also be accompanied by diagnostics based on the chamber rate of rise technique, described above. For instance, the chamber rate of rise analysis may indicate that there is an external leak, in addition to the composite base pressure notification indicating that the base pressure has risen above the acceptable limit. More generally, the composite base pressure and chamber rate of rise notifications may be of differing value to a customer depending on the customer's use of the tool 1001. Some customers, for example, may close the gate valve and the slit valve once a day, thereby triggering a chamber rate of rise notification; while others do so at different intervals. On the other hand, although a composite base pressure analysis is being performed all the time, it will not trigger a composite base pressure notification until the base pressure increase is above the customer's composite base pressure limit. The chamber rate of rise analysis can be combined with the composite base pressure analysis, when both are received, in that the rate of rise from the chamber rate of rise analysis can provide an estimate for what the change in the base pressure should be (based on the underlying physics of the system). Diagnostics techniques disclosed here may therefore be combined to produce useful diagnostics for a given customer.

A vent-to-atmosphere analysis may be performed. In particular, by performing an electronic analysis based on the Convectron® gauge data 3057 of FIG. 3, the system can detect when a chamber has been vented to atmospheric pressure within a specified period, such as the last twenty-four hours. If pumpdown pressure characteristics after venting are greater than a specified limit, an automated electronic notification can be sent to a customer recommending that all affected valves be checked.

Figure 4:
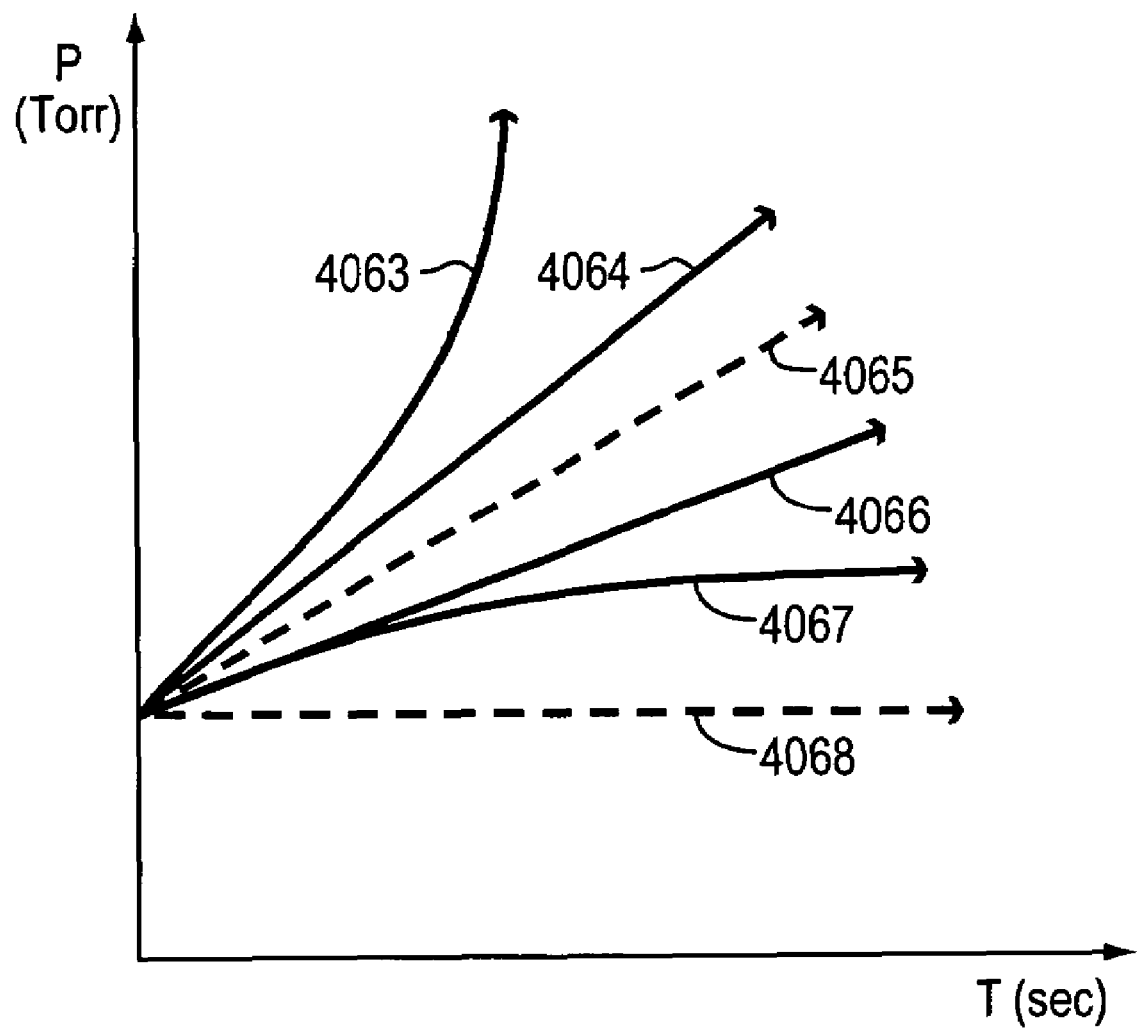
FIG. 4 is a graph of data used in a chamber rate of rise analysis to determine possible system states, in accordance with an embodiment of the invention.

FIG. 4 is a graph of data used in a chamber rate of rise analysis to determine possible system states. The graph shows different possible trajectories of pressure versus time, collected in the chamber rate of rise analysis, with pressure on the y-axis and time on the x-axis. If the rate of rise of the pressure is increasing as in curve 4063, the chamber rate of rise analysis may conclude that a system component has a leak or outgassing that is getting bigger with time (this is almost never observed). If the rate of rise of pressure is constant as in curve 4064, with a rate of rise value greater than a customer-specified limit 4065, the chamber rate of rise analysis may conclude that a system component has a leak of fixed size greater than the customer limit. If the rate of rise of pressure is a constant as in curve 4066, with rate of rise value less than the customer-specified limit 4065, the chamber rate of rise analysis may conclude that a system component has a leak of fixed size less than the customer limit. On the other hand, if the pressure trajectory at first increases, but then levels off as in curve 4067, the chamber rate of rise analysis may conclude that a system component is contaminated; as, for example, when there is contamination on the process chamber walls. In this case, after the chamber is closed, the contaminant gradually evaporates, is pumped away, and the pressure attains equilibrium, as in curve 4067. Finally, curve 4068 is a trajectory for an idealized perfect chamber, with constant pressure over time. A chamber rate of rise analysis may be performed to diagnose the state of the system (or a system component or subsystem) based on pressure trajectories such as those of FIG. 4. A notification may then be sent to a customer, indicating the results of such an analysis. For example, a notification may indicate, based on an analysis that reveals a pressure versus time trajectory such as curve 4064, that a leak of fixed size, above the customer-specified limit, is occurring in a given component from which the sensor data has been transmitted. In accordance with an embodiment of the invention, the chamber rate of rise analysis can include determining a first derivative of the pressure function with respect to time (such as the functions of FIG. 4), and optionally provide a plot of the derivative in a notification report. The derivative (or a second derivative or other analysis function) of the pressure function can be used to diagnose the state of the system component, to generate customer recommendations described above. In addition, a first or second derivative, or a curve fit, can be used to differentiate between leaks and outgassing.

Figure 5:
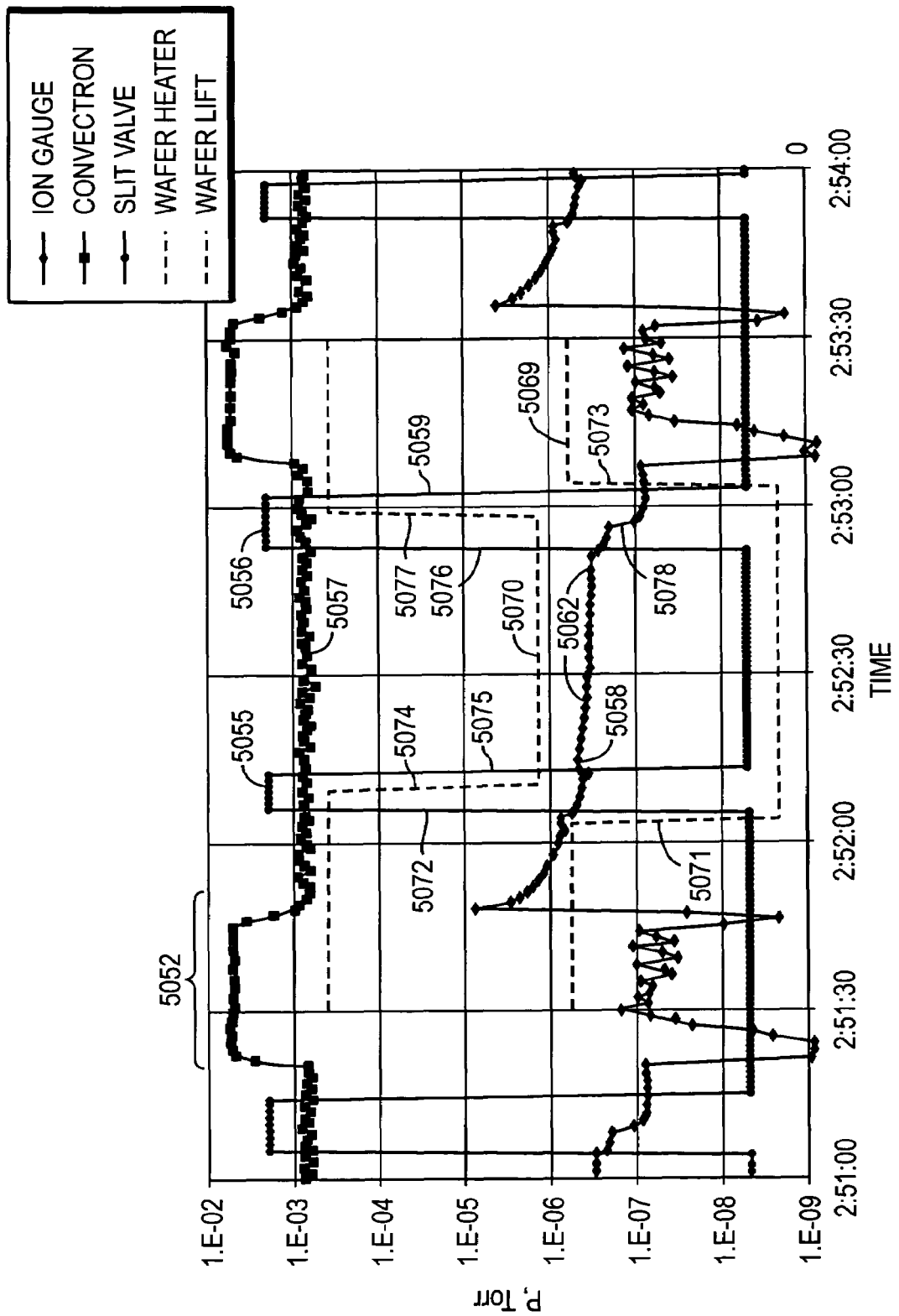
FIG. 5 shows a series of signals that are electronically diagnosed by an embodiment according to the invention to identify a leak in a wafer lift bellows.

FIG. 5 shows a series of signals received by local server 1043 that are electronically diagnosed to determine that there is a leak in a wafer lift bellows. Pressure in Torr is shown on a logarithmic scale on the y-axis, with time on the x-axis (in this example, pressure goes from $10^{-9}$ Torr up to $10^{-2}$ Torr, and time extends for three minutes). A Convectron® gauge pressure is plotted at 5057, an ion gauge pressure is plotted at 5058, a slit valve state signal is plotted at 5059, a wafer heater signal is plotted at 5069, and a wafer lift signal is plotted at 5070. A computer processor (associated, for example, with the data processing equipment of FIG. 2) can diagnose a wafer lift bellows leak by analyzing this data received by the local server 1043.

The signals recorded in FIG. 5 correlate to physical actions taking place in a chamber of tool 1001. The slit valve, whose signal is recorded at 5059, opens to allow a semiconductor wafer to move from the wafer handler into or out of the process chamber, at events 5055 and 5056. The wafer lift and wafer heater, whose signals are recorded at 5070 and 5069, move when the wafer is moved into the process chamber. As shown in FIG. 5, the wafer heater signal 5069 records the wafer heater moving down at 5071, before the slit valve opens at 5072 to let the wafer into the process chamber. After the second opening and closing of the slit valve at 5056, the wafer heater moves back up at 5073.

A cycle proceeds as follows. First, during a process stage 5052, the wafer heater and the wafer lift have the wafer pinned up in the process position within the process chamber. After the process is over, gas is pumped out of the chamber, and the wafer heater moves down at 5071. The wafer is still on the lift. The slit valve then opens at 5072, and a robot moves into the process chamber. The wafer lift then moves down at 5074, leaving the wafer on the robot. The robot then moves out of the process chamber, and the slit valve closes at 5075. The robot then picks up a new wafer outside the process chamber. The slit valve opens again at 5076. The wafer lift moves up at 5077, taking the new wafer. The wafer heater then moves up at 5073, pinning the new wafer in the process position, and beginning the cycle again.

The signals received by local server 1043 and shown in FIG. 5, can be interpreted by data processing equipment (as in FIG. 2) to determine that there is a leak in the wafer lift bellows. As can be seen at 5078, there is a sudden drop in the ion gauge pressure that coincides with the point in the cycle where the wafer lift is moving up, at 5077. By identifying the unusual pressure drop 5078, and correlating the timing of this pressure drop with the rise of the wafer lift at 5077, it can be determined that there is a leak in the wafer lift bellows. (In this particular case, the wafer lift bellows was leaking more in the down position). This determination can then be forwarded as an automatic electronic notification to a customer, along with a recommendation to take appropriate corrective action. This conclusion can be reinforced by other analysis of the data of FIG. 5, such as by determining that a pressure decrease 5062 is at a slightly slower rate than normal.

In this way, electronic diagnostic data collected from the cluster tool 1001 can be used to diagnose a vacuum problem with a particular component (here, the wafer lift bellows), and recommend corrective action. Other components can be identified by a broadly similar approach; for example, a similar abnormal pressure drop coinciding with a movement of the wafer heater can be used to diagnose a leak in a heater bellows. Other leaks that can be identified may include leaks in o-rings, slit valve bellows, gate seals, and the back side heater gas manifold. In one example, an o-ring leak can be identified by observing an increase in an aluminum process chamber's base pressure measured each day. For example, such an increase could be observed to begin after the chamber is opened on a given day. Once the customer is notified, the tool can be idled, and the o-ring can be replaced.

The ability to identify problems with specific components in this manner can help to prevent costly equipment failures and unscheduled downtime, before they occur. For example, in the prior art, some semiconductor manufacturers have been running their bellows to failure. The cluster tool 1001 is then stopped. Because the problem is unknown, the manufacturer often regenerates the cryopump (instead of looking at the bellows), which may take four hours; and then the same problem occurs. There may be a several day loss as the problem is diagnosed, and yield goes down. The ion gauge is de-gassed, with a half hour loss. Even when a leak check is performed, the bellows are inconveniently located, at a high temperature and with many wires obstructing access. Therefore, prior art techniques of running to failure and performing post-failure diagnostics can be costly to manufacturers. A manufacturer can instead predict the need for a specific component to be replaced, before it fails, and therefore avoid costly problems. Even for those manufacturers who change error-prone components frequently, costs can be reduced by maintaining those components just in time, instead of erring on the side of replacing the components too often.

There is therefore provided a useful predictive way of identifying the source of vacuum quality anomalies in a process vacuum environment, based on the state of process vacuum environment when the anomalies occur.

Figure 6:
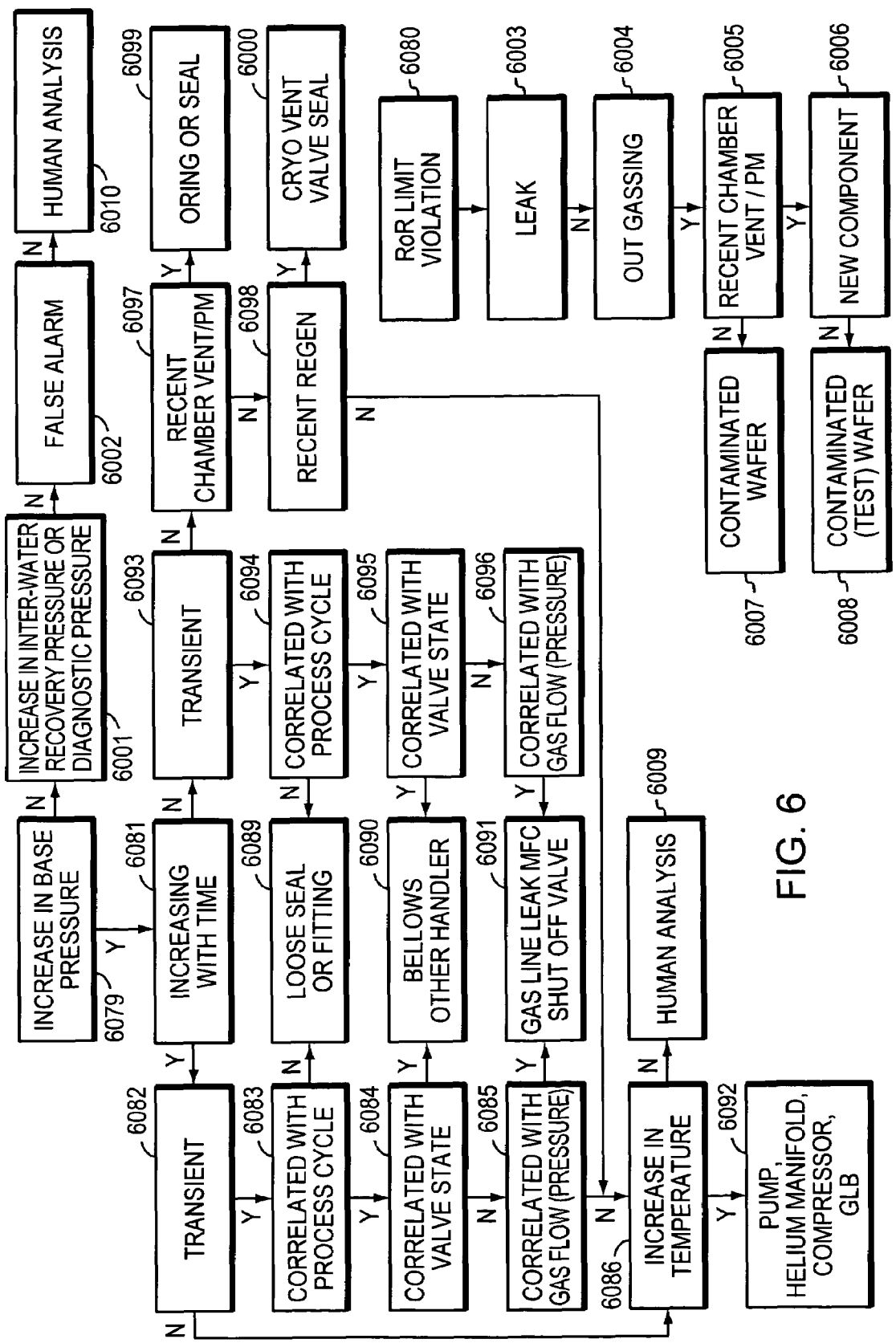
FIG. 6 shows a fault analysis flow chart that illustrates operation of a method for electronic diagnostics in accordance with an embodiment of the invention.

FIG. 6 shows a fault analysis flow chart that illustrates operation of a method for electronic diagnostics. A computer processor performing a diagnostic analysis of a cluster tool 1001 based on data received by server 1043 may, for example, operate computer code according to the flow chart of FIG. 6, to determine which specific component of the tool 1001 is malfunctioning. The code may also operate with different specific steps using other diagnostic techniques based on similar concepts, as will be appreciated by those of skill in the art. Fault analysis begins from either an observation of an increase in base pressure, at 6079, such as in a composite base pressure analysis; or from an observation of a rate of rise limit violation or abnormal trend, at 6080, such as in a chamber rate of rise analysis. If the increase in base pressure is increasing with time 6081, then a series of inquiries at 6082-6086 determine whether there is a fault with a loose seal or fitting 6089, a bellows or other handler 6090, a gas line leak or mass flow controller shut-off valve 6091, or a problem 6092 with a pump, helium manifold, or compressor.

The inquiries at 6082-6086 relate to whether there is a transient 6082; whether the transient is correlated with the process cycle 6083, valve state 6084, or gas flow (pressure) 6085; and whether there is an increase in temperature 6086. The results (yes or no, symbolized by Y or N in FIG. 6) determine the outcome of the diagnosis as one of faults 6089-6092, as indicated by the arrows in FIG. 6. Other inquires found at 6093-6098 are used if base pressure 6082 is not increasing with time, and may lead to the possible diagnoses of an o-ring or seal problem 6099 or a cryo-vent or valve seal problem 6000. Inquiries 6093-6098 relate to whether there is a transient 6093; whether the transient is correlated with the process cycle 6094, valve state 6095, or gas flow (pressure) 6096; and whether there has been a recent chamber vent or planned maintenance 6097 or a recent regeneration 6098.

If there is no increase in base pressure 6079, then a computer processor determines whether there is an increase in inter-wafer recovery pressure or diagnostic pressure 6001; if so, a similar line of inquiry is followed from step 6081, and if not, the fault may be a false alarm 6002.

Inquiries 6003-6006 are used when there is a rate of rise limit violation 6080, and include whether there is a leak 6003, whether there is outgassing 6004, whether there has been a recent chamber vent or planned maintenance 6005, and whether a new component has been installed 6006. The answers to these inquiries, determined by the processor in accordance with analytic techniques described herein, are used to determine whether there is a contaminated wafer 6007 or a contaminated test wafer 6008.

At some locations 6009, 6010, the processor's analysis cannot determine what the cause of a fault is, and may give notification of the need for a human (non-automated) analysis.

An automated system may continue to check the system's status and performance after components have been fixed, to ensure that the correct problem was diagnosed and that the fix works.

Figure 7:
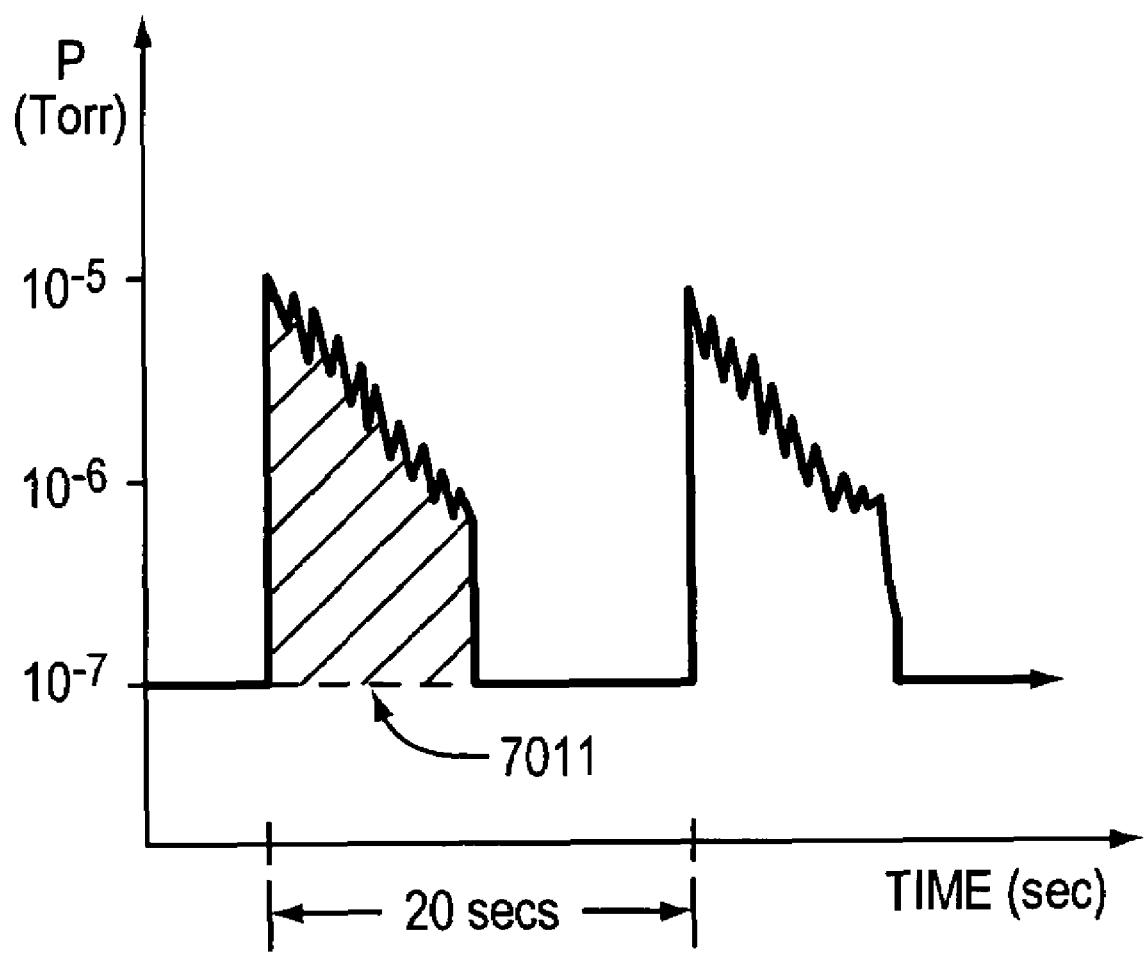
FIG. 7 shows pressure versus time signals produced by an implant process, which may be electronically diagnosed by an embodiment according to the invention.

FIG. 7 shows pressure versus time signals that may be received by a local server from signals produced by an implant process, and electronically diagnosed by an embodiment according to the invention. A computer processor (associated, for example, with the data processing equipment such as in FIG. 2) can diagnose a contaminated cryopump in the implant process by analyzing this data received by the local server. Similar types of analysis can be performed to diagnose an implant process as are described above for PVD (physical vapor deposition) tools. Pressure versus time data such as that of FIG. 7 is collected, and may be analyzed by processes similar to the chamber rate of rise analysis and the composite base pressure analysis, above.

Because of the different nature of an implant process, different analyses may also be used. In an implant, an ion beam is moved relative to the surface of a semiconductor wafer to change its chemical/electrical properties. Because there is a photoresist material on the surface of the wafer, the energy of the beam creates hydrocarbon contaminants in the implant chamber. Hydrocarbon contaminants produced in this way can hinder absorption of hydrogen and other gases that are present in the chamber. The hydrogen capture capacity of the chamber's pump is reduced, and the pump requires service.

To detect such a fault, the system can use a base pressure analysis similar to the above, sending a notification when the base pressure exceeds a customer-specified limit. Alternatively, a computer processor can analyze an area under the pressure-time curve, such as shaded area 7011 of FIG. 7, adjust for hydrogen concentration in the gas environment, and express it as a mass or volume of hydrogen gas. The sum total of such areas can be summed to determine how much hydrogen gas has been pumped. An increase in base pressure can then be determined, based on the correlation of an increase in base pressure with the accumulated summed area under the pressure-time curve, on a normalized basis. A notification can then be sent when the calculated base pressure exceeds the customer-specified limit.

Figure 8:
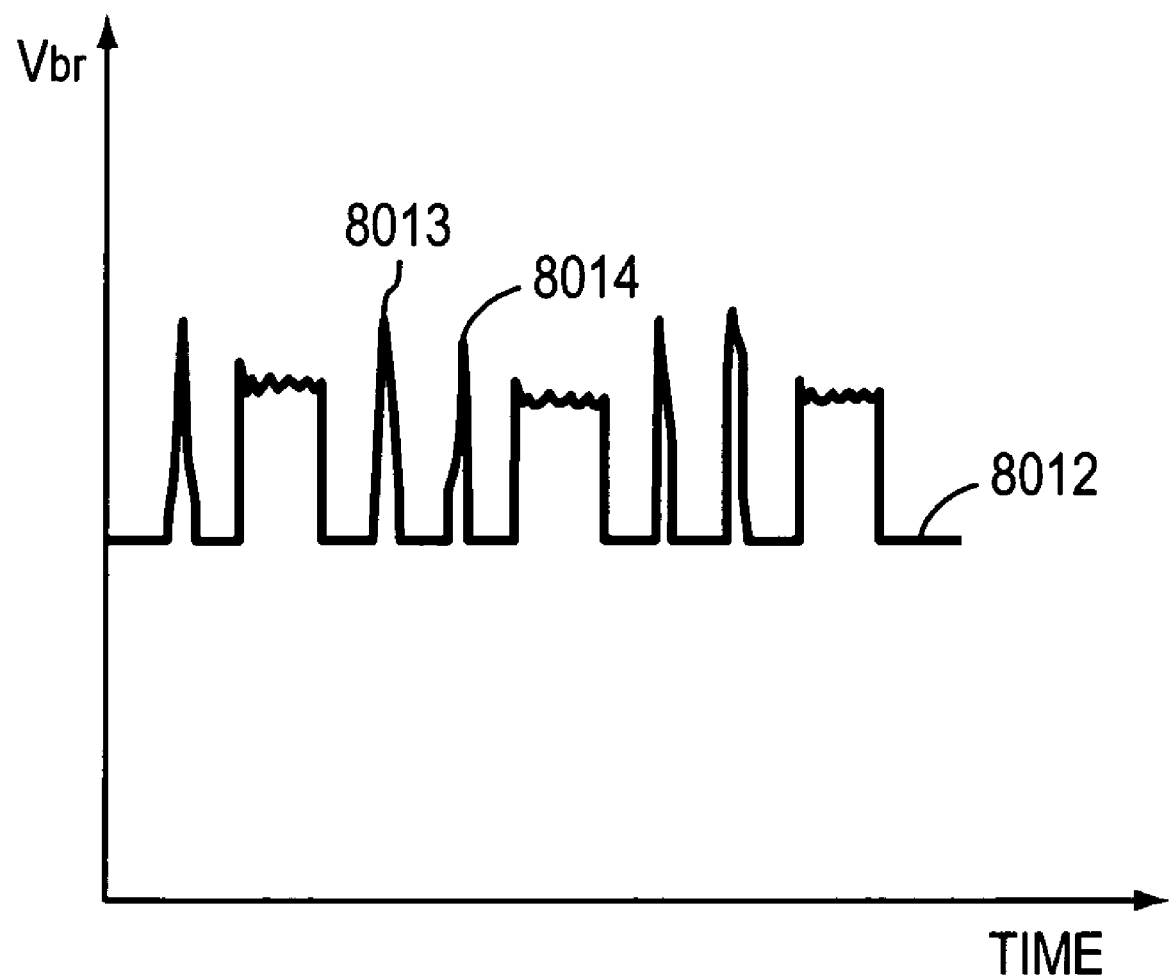
FIG. 8 shows accelerometer vibrations versus time, which may be received by a local server from signals produced by a turbomolecular pump, and electronically diagnosed by an embodiment according to the invention.

FIG. 8 shows accelerometer vibrations versus time, which may be received by a local server from signals produced by a turbomolecular pump and electronically diagnosed. A computer processor (associated, for example, with data processing equipment such as in FIG. 2) can predict turbomolecular pump failures before they occur, by analyzing this data received by the local server. Signal 8012 measures a voltage, detected by an accelerometer on the turbomolecular pump, that is proportional to vibrations of the pump. Spikes such as 8013 and 8014 are detected when slit valves in the chamber being pumped are opened. Thus, impulses such as the slit valves, gate valves, wafer handler robot, and load lock/elevator can be detected, and correlated with anomalous measurements for the pump, in a similar fashion to other techniques described herein. Diagnosing problems with a turbomolecular pump in this way allows the pump to be replaced before a catastrophic failure occurs.

Techniques similar to those described herein may be used to detect within-batch variations between semiconductor wafers. Analyses similar to those described herein are used to determine system and component conditions during the fabrication of each wafer or each set of wafers. If those conditions are measurably different, they could signify a within-batch variation for which an automatic notification can be sent to a customer.

Figure 9:
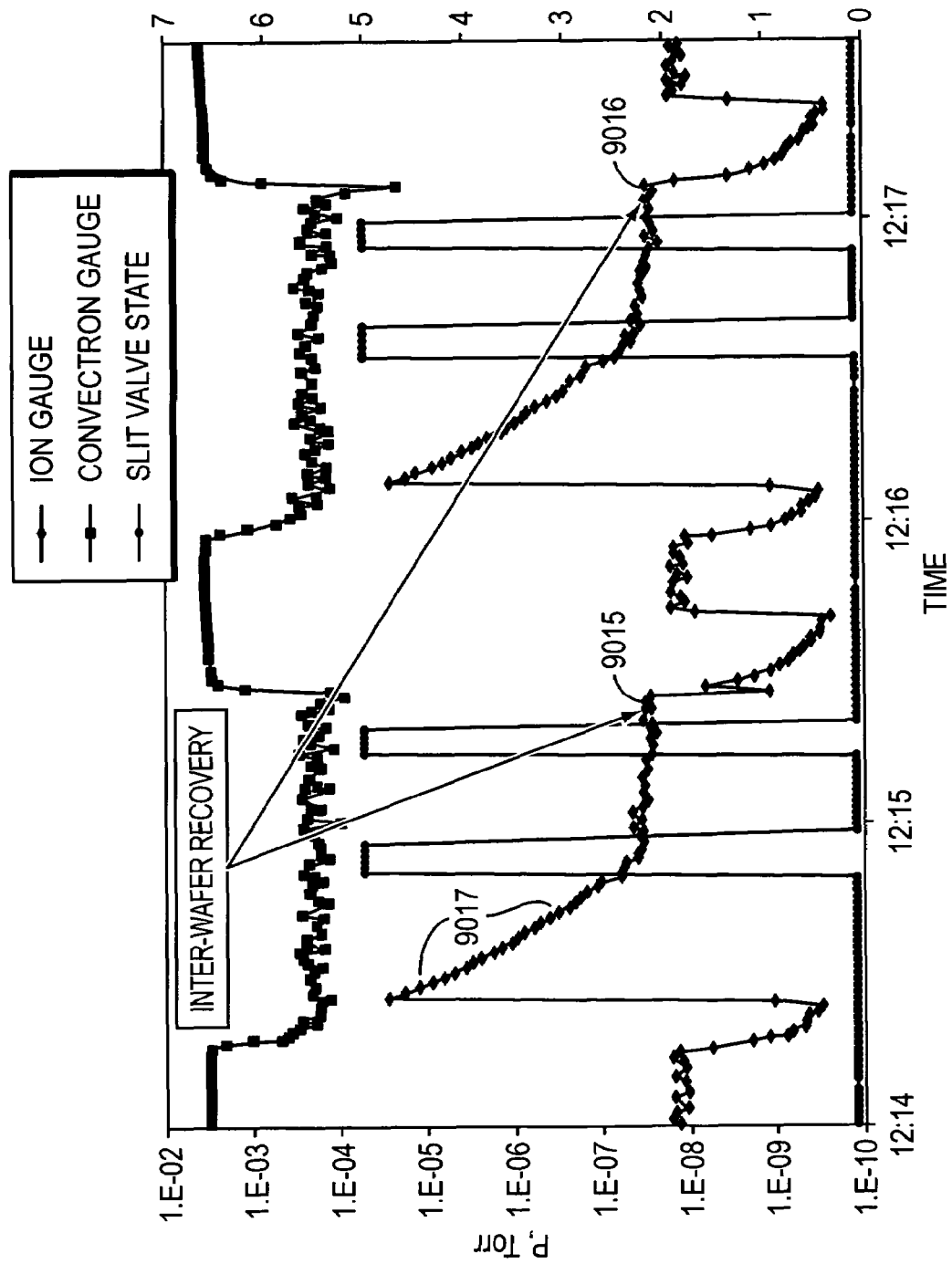
FIG. 9 shows a series of signals received by local server 1043 that may be electronically analyzed by an embodiment according to the invention in an inter-wafer recovery pressure analysis.

FIG. 9 shows a series of signals received by local server 1043 that may be electronically analyzed in an inter-wafer recovery pressure analysis. The data shown in FIG. 9 is similar to that of FIG. 3. A computer processor (associated, for example, with the data processing equipment of FIG. 2) can perform an inter-wafer recovery pressure analysis on this data received by the local server 1043. Usually, a tool controller 1018 measures the recovery pressure at the end of the recovery pressure decay (e.g. points 9015 and 9016), and shuts down the process if the pressure is more than a specified limit. However, this method allows a recovery pressure problem to be detected before the system would normally be shut down by the tool controller; and a notification to be sent to the customer to take appropriate corrective action.

Because there are a large number of inter-wafer recovery curves (such as curve 9017 of FIG. 9) per day, it may be necessary to use data reduction methods before analyzing the curves. For example, a group of recovery curves may be characterized by creating one or more composite recovery curves by averaging the observed recovery curves and then curve fitting the composite curves. Alternatively, a curve fit may be performed for all of the observed recovery curves, and then the curve fit parameters may be averaged. Characterization of the recovery curves may show that two or more classes of recovery curves exist for any given process chamber. Multiple classes may arise from multiple process recipes or transient fault conditions. A curve fit to a given recovery curve can be used to extrapolate the pressure at any time, P(t), or to estimate the base pressure in a similar fashion to that described above.

Figure 10:
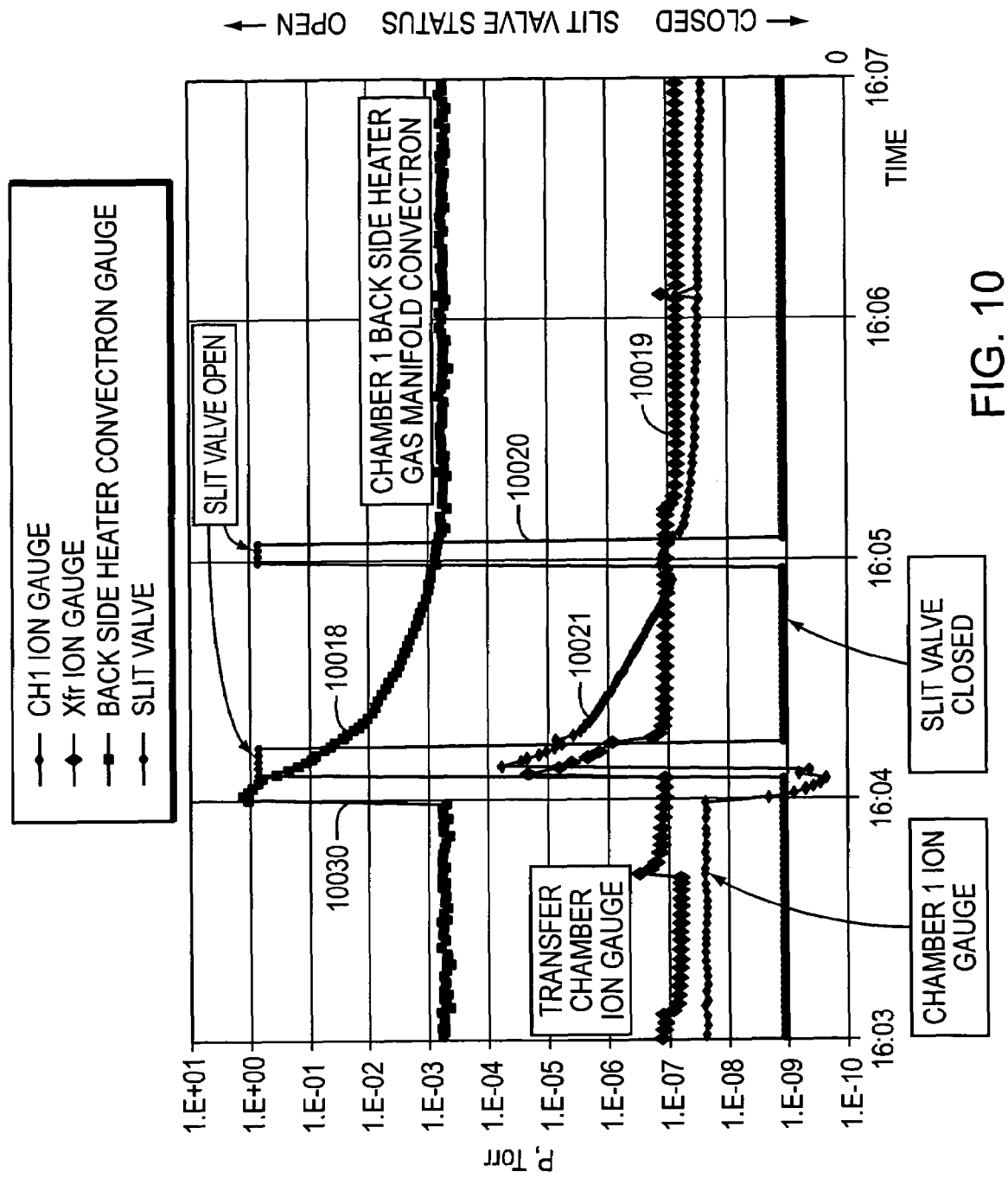
FIG. 10 shows signals that may be used to identify a pressure burst in a backside heater gas manifold, in accordance with an embodiment of the invention.

FIG. 10 shows signals received by local server 1043, which may be used to identify a pressure burst in a back side heater gas manifold, in accordance with an embodiment of the invention. A Convectron® gauge pressure for the chamber 1 back side heater gas manifold is plotted at 10018, an ion gauge pressure for the transfer chamber is plotted at 10019, a slit valve state signal is plotted at 10020, and an ion gauge pressure for chamber 1 is plotted at 10021. In this case, a pressure burst in the back side wafer heater line can cause a pressure burst in the chamber. Such an event can cause elevated pressures while the tool attempts to lower the chamber pressure in preparation to process the next wafer. The signals shown in FIG. 10 can be analyzed to determine that there is a pressure burst in a back side heater gas manifold; and automatic notification can be sent to the customer. For example, an analysis can detect an abnormal burst in pressure 10030 before the slit valve opens.

Figure 11:
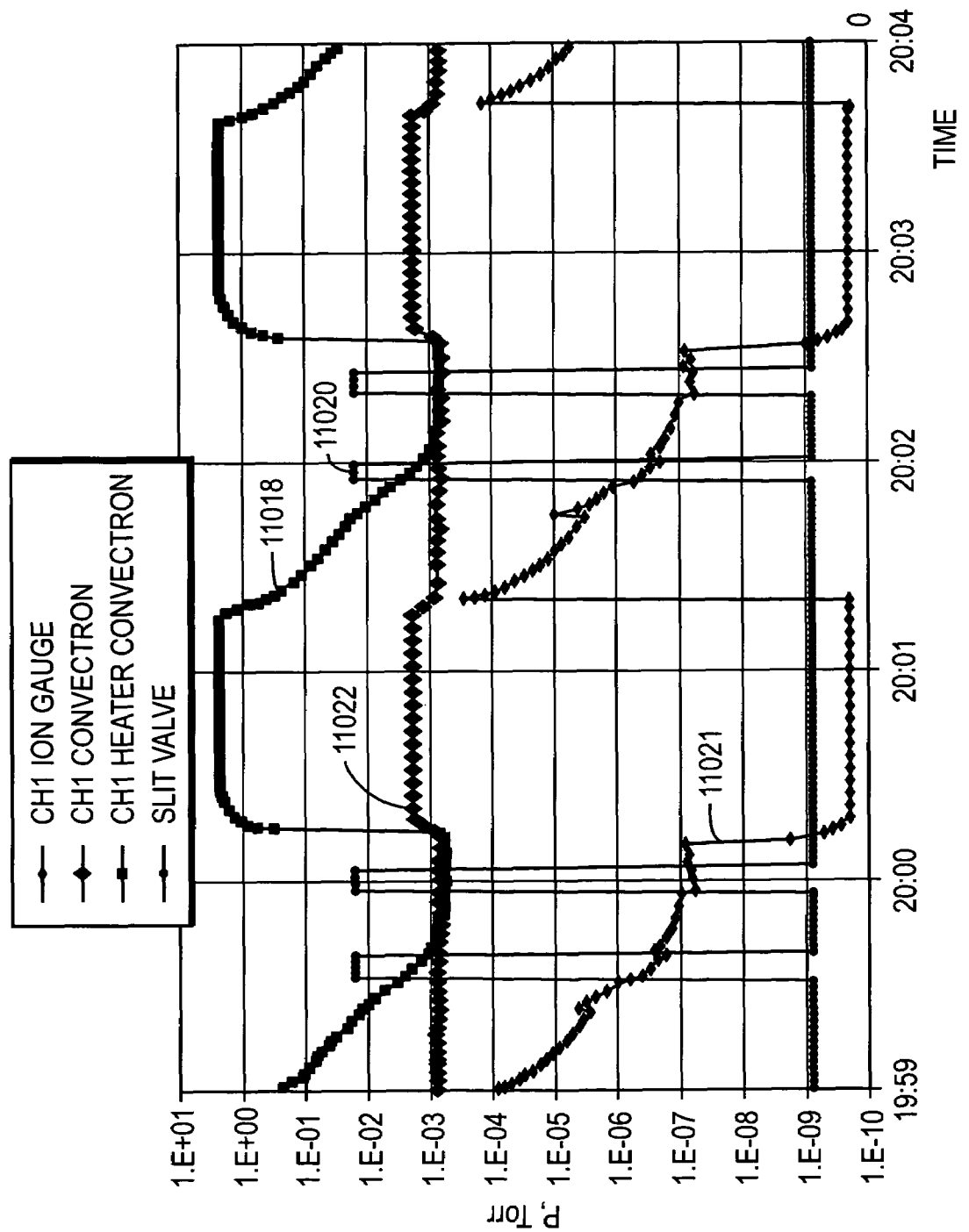
FIG. 11 shows similar parameters to those of FIG. 10, during normal operation.

For contrast with the anomaly of FIG. 10, FIG. 11 shows similar parameters to those of FIG. 10, during normal operation. A Convectron® gauge pressure for the chamber 1 back side heater gas manifold is plotted at 11018, a slit valve state signal is plotted at 11020, a Convectron® gauge pressure for chamber 1 is plotted at 11022, and an ion gauge pressure for chamber 1 is plotted at 11021. If a similar failure to that of FIG. 10 occurs, the transfer chamber may also be affected, if the slit valve is open during the burst or while the PVD is recovering. When the slit valve opens, some of the gas blows out into the transfer chamber, thereby raising the pressure and allowing cross contamination to other process chambers.

Figure 12:
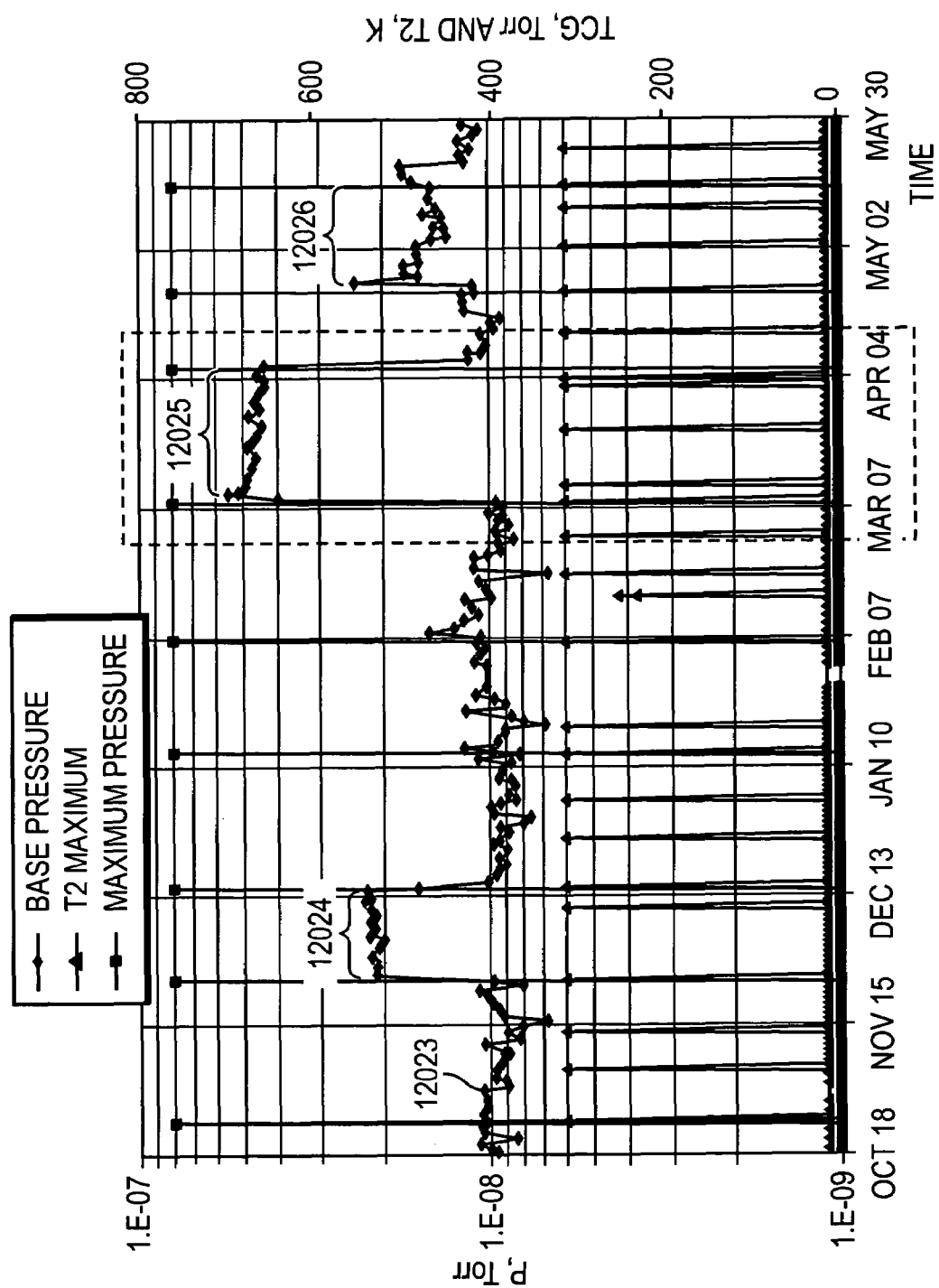
FIG. 12 shows base pressure data that can be used to identify outgassing due to contamination within a vacuum chamber, in accordance with an embodiment of the invention.

FIG. 12 shows base pressure data that can be used to identify outgassing due to contamination within a vacuum chamber. FIG. 12 shows base pressure data 12023, determined in a similar fashion to that described above, over a period of several months. The base pressure can be seen to be elevated for three separate periods 12024-12026, which correspond to contamination that occurred after chamber venting.

Figure 13:
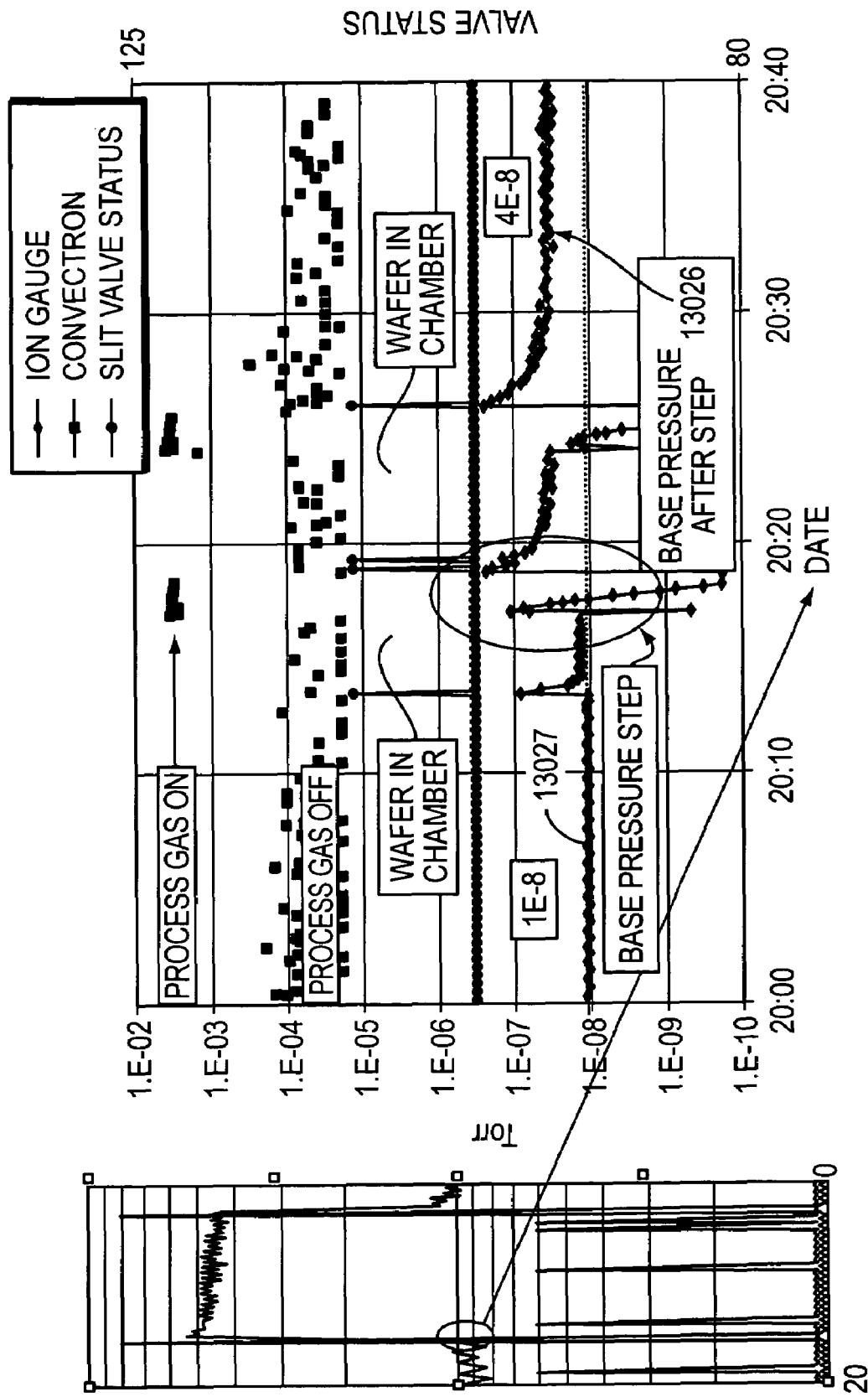
FIG. 13 is a graph of ion gauge pressure during the processing of the first wafer following the chamber vent of FIG. 12, with base pressure determined in accordance with an embodiment of the invention, and showing the effect of contamination from the first wafer on base pressure.

FIG. 13 is a graph of ion gauge pressure during the processing of the first wafer following the chamber vent at 12025 in FIG. 12, with base pressure determined. As can be seen, the base pressure determined at 13026 after the wafer processing is increased relative to the base pressure at 13027 before the wafer processing. Such an increase in base pressure is used by to determine that chamber contamination occurred during the wafer processing.

Figure 14:
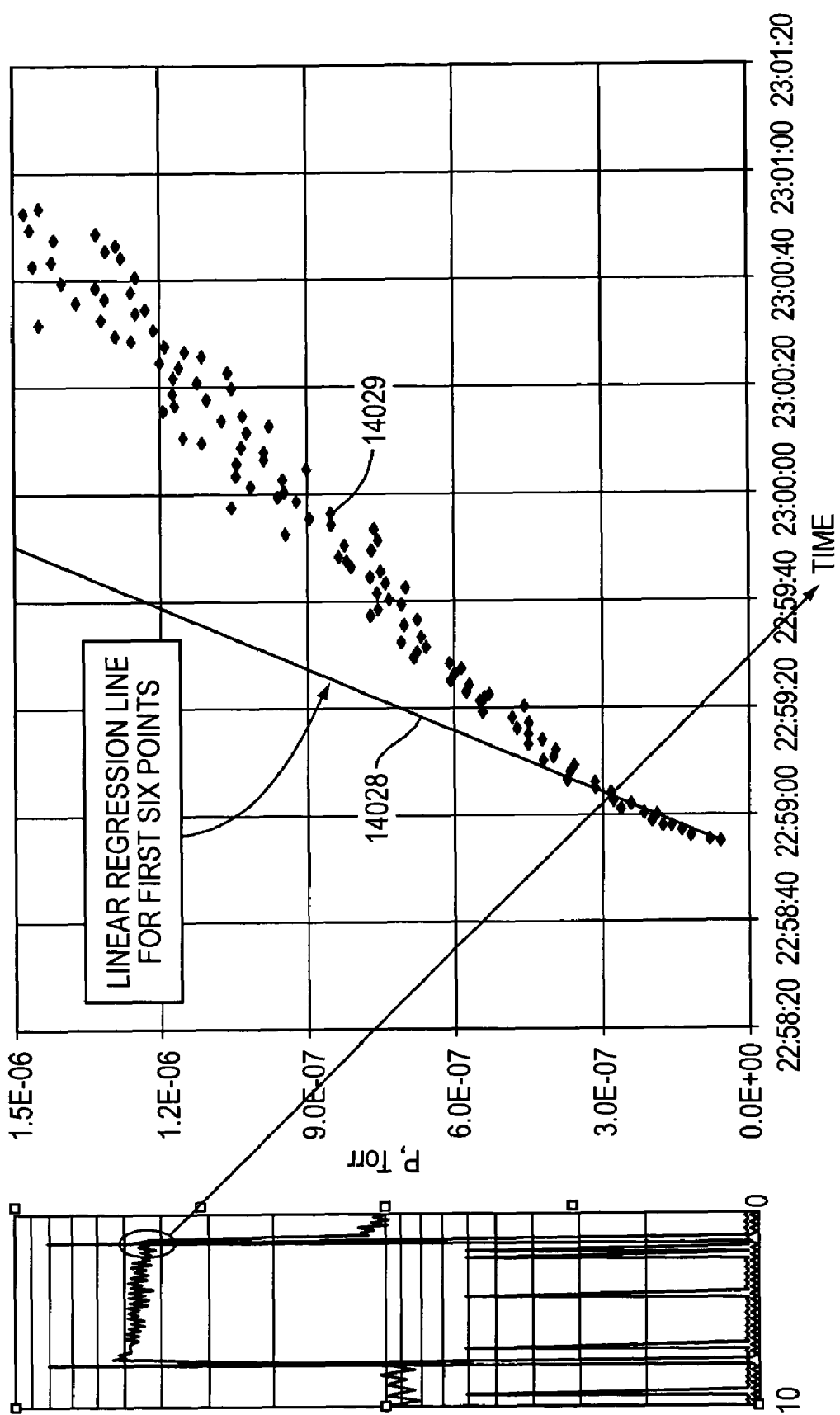
FIG. 14 is a graph of a rate of rise analysis performed during the period shown in FIG. 13, in accordance with an embodiment of the invention.

FIG. 14 is a graph of a rate of rise analysis performed during the period shown in FIG. 13. Because the gate valve was closed, a gate valve rate of rise analysis could be performed. Linear regression line 14028 for the first six points of the ion gauge pressure 14029 is indicative of a fixed size leak. However, a decreasing chamber rate of rise is indicative of outgassing. The system can detect this in a rate of rise analysis and diagnose the problem of outgassing.

Figure 15A:
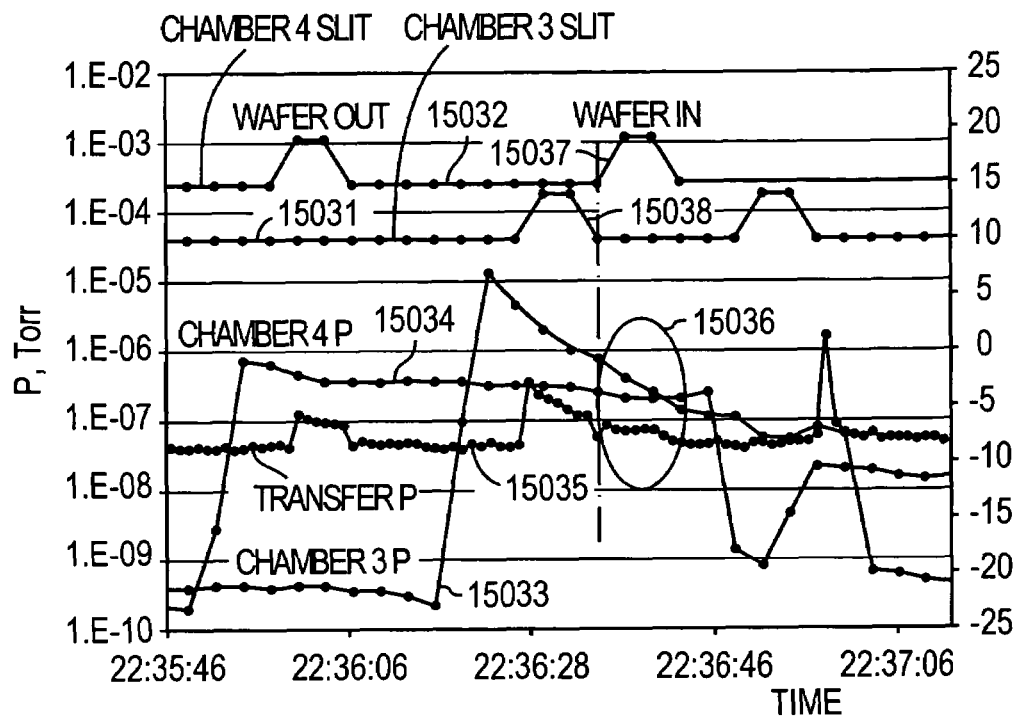
FIGS. 15A and 15B illustrate cross contamination detection, which may be performed in accordance with an embodiment of the invention.
Figure 15B:
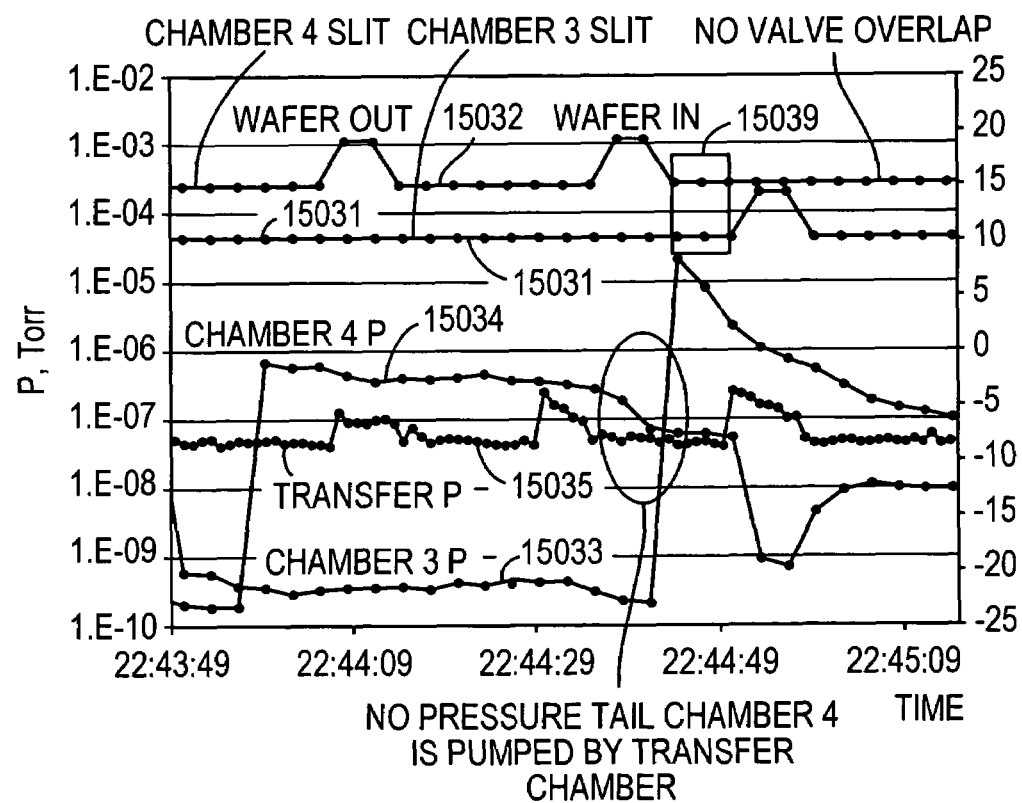

FIGS. 15A and 15B illustrate cross contamination detection, which may be performed in an embodiment of the invention. These two figures show slit valve state signals for a first chamber 15031 and a second chamber 15032, along with pressures 15033 and 15034 for the two chambers and for the transfer chamber 15035. In FIG. 15A, an anomaly is identified at 15036, in which the second chamber slit valve opens at 15037 the instant that the first chamber slit valve closes at 15038. This does not allow the transfer chamber to recover from the first chamber gas load before the second chamber slit valve opens. Cross-contamination from one chamber to the transfer chamber, and then to the other chamber, can cause chemistry problems in deposited films and affect quality. Thus, when timing such as that of FIG. 15A is observed, notification may be given that corrective action should be taken to reset the slit valve timing to specification. FIG. 15B shows the corrected slit valve timing condition. There is a longer interval 15039 between slit valve openings. The transfer chamber can therefore reach a lower base pressure before the chamber slit valve is opened.

Analyses such as those described herein may be useful in the "pre-flight" test time when a vacuum system (such as a semiconductor manufacturing tool) is turned on (before fabrication begins). In addition, it should be noted that some useful parameters to be used with techniques similar to those described herein include analyzing the system's time to reach a specified pressure, or pressure at a specified time; or pressure at a specified event, or change in pressure associated with a specified event. Also, it is useful to measure the pressure or change in pressure in two adjoining vacuum chambers when an isolation valve between them is opened.

It should be appreciated that appropriate circuitry, signal lines, digital components and processors, sampling devices, analog-to-digital converters, network communications devices, and computer code running on digital media are to be used to implement techniques described herein. Although some analysis may be performed manually or by humans, to the extent possible the process is automated, from measurement of physical vacuum parameters through to generation of an automated electronic notification to a customer or engineer. It is to be understood that appropriate software code may be written to implement analysis techniques described above, including curve-fitting, analysis functions, and other features discussed above.

It should also be appreciated that automated diagnostics techniques discussed herein are not necessarily limited to specific vacuum components, or to semiconductor cluster tools; but instead have wide application in the field of vacuum processes. For example, a "process vacuum environment" as used herein and in the attached claims may include process chambers, transfer chambers, load locks, and buffer chambers.

By contrast with prior art pattern recognition and statistical techniques, an embodiment according to the invention uses a deterministic method that relies on an understanding of the physics of a vacuum system to predict faults before they occur. Pattern recognition techniques instead require generating component failures to be able to recognize the pattern again. Statistical techniques, because they do not involve an understanding of the physics of the vacuum system, cannot determine why a given fault has occurred; and require training or calibration to recognize normal and abnormal process patterns.

Because of its predictive capabilities, a system may minimize unscheduled downtime and reduce scheduled downtime; reduce maintenance costs through accurate diagnosis; increase yield by producing optimum vacuum conditions; and allow faults to be analyzed and corrected before they have an impact on the process, yield, and throughput. A user gains a definitive understanding of a fault and its causes, because an analysis is based on the physical properties and interactions within the vacuum space.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of identifying a source of a vacuum quality problem in a vacuum environment associated with a tool, the method comprising:
    gathering and storing vacuum environment data;
    identifying an anomaly within the vacuum environment;
    determining a tool component operating state when the anomaly likely occurred; and
    determining the source of the vacuum quality problem based on a state of the vacuum environment when the anomaly likely occurred and the tool component operating state when the anomaly likely occurred.

2. A method according to claim 1, wherein the vacuum environment is in a semiconductor manufacturing tool.

3. A method according to claim 1, wherein the step of determining the source of the vacuum quality problem is further based on state of vacuum equipment.

4. A method according to claim 3 wherein the step of determining the source of the vacuum quality problem is further based on history of the state of the vacuum environment.

5. A method according to claim 4, wherein the step of determining the source of the vacuum quality problem is further based on history of tool state.

6. A method according to claim 5 wherein the step of determining the source of the vacuum quality problem is further based on history of vacuum equipment.

7. A method according to claim 1 wherein the step of determining the source of the vacuum quality problem is further based on history of the state of the vacuum environment.

8. A method according to claim 1, wherein the step of determining the source of the vacuum quality problem is further based on history of tool state.

9. A method according to claim 1 wherein the step of determining the source of the vacuum quality problem is further based on history of vacuum equipment.

10. A method according to claim 1 wherein the step of identifying comprises analyzing vacuum environment history and tool state history.

11. A method according to claim 10 wherein the step of analyzing vacuum environment history includes analysis of one or more measurements from a group consisting of a pressure rate of a rise, base pressure, base pressure trend, residual gas analysis, operating pressure, operating pressure history, and pressure recovery curve.

12. A method according to claim 1 wherein the anomaly is a change in base pressure.

13. A method according to claim 1 wherein the anomaly is a change in pressure rate of rise.

14. A method according to claim 1 wherein the source of anomaly is identified prior to failure for preventative maintenance.

15. A method according to claim 1 wherein the steps of identifying the anomaly and determining the source of the vacuum quality problem are by means of automatic data analysis.

16. A method according to claim 1 further comprising providing automatic electronic notification of the source of the vacuum quality problem.

17. A method according to claim 1 wherein the step of determining the source of the vacuum quality problem is further based on a general tool operating state.

18. A method according to claim 17 wherein the general tool operating state includes a state from a group consisting of idling, turned off, qualification, pumpdown, and processing.

19. A method according to claim 1 wherein the tool component operating state is determined by sensing the tool component operating state.

20. A method according to claim 1 wherein the tool component operating state is determined by analysis of the vacuum environment data.

21. A method according to claim 1, wherein the tool component operating state is determined by analyzing impulse data from an accelerometer.

22. A system for identifying a source of a vacuum quality problem in a vacuum environment associated with a tool, the system comprising at least one computer for:
gathering and storing vacuum environment data;
identifying an anomaly within the vacuum environment;
determining a tool component operating state when the anomaly likely occurred; and
determining the source of the vacuum quality problem based on a state of the vacuum environment when the anomaly likely occurred and the tool component operating state when the anomaly likely occurred.

23. A system according to claim 22, wherein the vacuum environment is in a semiconductor manufacturing tool.

24. A system according to claim 22, wherein the step of determining the source of the vacuum quality problem is further based on state of vacuum equipment.

25. A system according to claim 24 wherein the step of determining the source of the vacuum quality problem is further based on history of the state of the vacuum environment.

26. A system according to claim 25, wherein the step of determining the source of the vacuum quality problem is further based on history of tool state.

27. A system according to claim 26 wherein the step of determining the source of the vacuum quality problem is further based on history of vacuum equipment.

28. A system according to claim 22 wherein the step of determining the source of the vacuum quality problem is further based on history of the state of the vacuum environment.

29. A system according to claim 22, wherein the step of determining the source of the vacuum quality problem is further based on history of tool state.

30. A system according to claim 22 wherein the step of determining the source of the vacuum quality problem is further based on history of vacuum equipment.

31. A system according to claim 22 wherein the step of identifying comprises analyzing vacuum environment history and tool state history.

32. A system according to claim 31 wherein the step of analyzing includes analysis of one or more measurements from a group consisting of a pressure rate of a rise, base pressure, base pressure trend, residual gas analysis, operating pressure, operating pressure history, and pressure recovery curve.

33. A system according to claim 22 wherein the anomaly is a change in base pressure.

34. A system according to claim 22 wherein the anomaly is a change in pressure rate of rise.

35. A system according to claim 22 wherein the source of anomaly is identified prior to failure for preventative maintenance.

36. A system according to claim 22 wherein the steps of identifying the anomaly and determining the source of the vacuum quality problem are by means of automatic data analysis.

37. A system according to claim 22 further comprising providing automatic electronic notification of the source of the vacuum quality problem.

38. A system according to claim 22 wherein the step of determining the source of the vacuum quality problem is further based on a general tool operating state.

39. A system according to claim 38 wherein the general tool operating state includes a state from a group consisting of idling, turned off, qualification, pumpdown, and processing.

40. A system according to claim 22 wherein the tool component operating state is determined by sensing the tool component operating state.

41. A system according to claim 22 wherein the tool component operating state is determined by analysis of the vacuum environment data.

42. A system according to claim 22, wherein the tool component operating state is determined by analyzing impulse data from an accelerometer.

43. A computer-readable medium carrying one or more sequences of instructions for identifying a source of a vacuum quality problem in a vacuum environment associated with a tool, wherein execution of the one or more sequences of instructions by one or more processors causes the one or more processors to perform the steps of:
gathering and storing vacuum environment data;
identifying an anomaly within the vacuum environment;
determining a tool component operating state when the anomaly likely occurred; and
determining the source of the vacuum quality problem based on a state of the vacuum environment when the anomaly likely occurred and the tool component operating state when the anomaly likely occurred.

44. A computer-readable medium as claimed in claim 43 wherein the execution of the one or more sequences of instructions causes the one or more processors to perform the further step of providing automatic electronic notification of the source of the vacuum quality problem.

* * * * *